(12) United States Patent
Chen et al.

(10) Patent No.: US 7,999,930 B2
(45) Date of Patent: Aug. 16, 2011

(54) DETECTION SYSTEM AND OPTICAL FIBER FOR USE IN SUCH SYSTEM

(75) Inventors: Xin Chen, Corning, NY (US); Joohyun Koh, Painted Post, NY (US); Ming-Jun Li, Horseheads, NY (US); Daniel Aloysius Nolan, Corning, NY (US)

(73) Assignee: Corning Incorporated, Corning, NY (US)

(*) Notice: Subject to any disclaimer, the term of this patent is extended or adjusted under 35 U.S.C. 154(b) by 435 days.

(21) Appl. No.: 12/365,417

(22) Filed: Feb. 4, 2009

(65) Prior Publication Data

US 2010/0085558 A1 Apr. 8, 2010

Related U.S. Application Data

(60) Provisional application No. 61/195,443, filed on Oct. 7, 2008.

(51) Int. Cl.
*G01N 21/00* (2006.01)
(52) U.S. Cl. ...................................... 356/73.1
(58) Field of Classification Search ............... None
See application file for complete search history.

(56) References Cited

U.S. PATENT DOCUMENTS

| | | | |
|---|---|---|---|
| 5,384,635 A | 1/1995 | Cohen et al. | 356/73.1 |
| 6,946,646 B2 | 9/2005 | Chen et al. | 250/227.17 |
| 7,142,736 B2 | 11/2006 | Patel et al. | 385/12 |
| 7,164,469 B1* | 1/2007 | Chen et al. | 356/73.1 |
| 7,173,690 B2 | 2/2007 | Haran | 356/73.1 |
| 7,212,281 B2* | 5/2007 | Tanigawa et al. | 356/73.1 |
| 7,362,427 B2* | 4/2008 | Fayolle et al. | 356/73.1 |

OTHER PUBLICATIONS

"Application of fiber optic distributed sensor for strain measurement in civil engineering"; Kurashima et al; SPIE vol. 3241; pp. 247-258.
"Overview of Mach-Zehnder Sensor Technology and Applications"; Dandridge et al; SPIE vol. 985; Fiber Optic and Laser Sensors V1 (1988) pp. 34-52.
"Properties of polarization evolution in spun fibers"; Chen et al; 2003 Optical Society of America; Optics Letters, vol. 28, No. 21, Nov. 1, 2003; pp. 2028-2030.
"Polarization Evolution in Spun Fibers"; Chen et al; Proc. of SPIE vol. 6019, pp. 60192J-1-60192J-13, 2005.
"Polarization mode dispersion of spun fibers with randomly varying birefringence"' Pizzinat et al; 2003 Optical Society of America; pp. 390-392.

* cited by examiner

*Primary Examiner* — Tu T Nguyen
(74) *Attorney, Agent, or Firm* — Svetlana Z. Short

(57) ABSTRACT

A detection system comprising: (i) an optical fiber, the optical fiber having (a) a length L≧1 km; (b) beat length between 10 m and 100 m; and (c) beat length uniformity over any distance of at least 100 m within the length L is characterized by standard deviation σ, where |σ|≦10 m; (ii) an OTDR coupled to the fiber and including (a) a radiation source providing pulsed radiation to the fiber, (b) a detection system capable of detecting radiation that is backscattered back through the fiber; and (iii) at least one polarizer situated between the fiber and the detector, such that the backscattered radiation passes through the polarizer before reaching the detector.

20 Claims, 11 Drawing Sheets

DETECTION SYSTEM AND OPTICAL FIBER FOR USE IN SUCH SYSTEM

FIELD OF THE INVENTION

This application claims the benefit of and priority to U.S. Provisional Patent Application No. 61/195,443 filed on Oct. 7, 2008 entitled, "Detection System and Optical Fiber for Use in Such System", the content of which is relied upon and incorporated herein by reference in its entirety.

The present invention relates generally to a method and system for detecting a disturbance along the length of the fiber, and particularly to a method and system that utilizes Polarization Optical Time Domain Reflectometry (POTDR) for identifying such disturbance.

TECHNICAL BACKGROUND

Distributed fiber optic sensing systems are utilized in applications requiring architectural and structuring monitoring, temperature and pressure measurements and for intrusion detection. Standard single mode and multimode fibers are often used for these applications. Distributed fiber optic sensing systems have been utilized for monitoring key infrastructures such as buildings, oil pipelines, and bridges.

In infrastructure monitoring, distributed fiber optic sensing systems provide information on perturbations along the path that can trigger alarm when there is a substantial and/or abnormal change of fiber strain. Thus, distributed fiber optic sensing systems have important applications in ensuring the early detection of deterioration of these critical infrastructures and timely repairing when necessary.

In security applications, distributed fiber optic sensing systems provide information about an intrusion into a protected area or facility when a particular portion of perimeter is disturbed. The protected area or facility of high interest can be a government or military site, commercial airports, water treatment site, or power generation plant. The need for intrusion detection is greatly driven by the demand for securing sites carrying critical functions, and recently such need is further highlighted by the government's counter-terrorism agenda.

Distributed fiber optic sensing systems that utilize polarization effects require sensing a small change in the optical fiber. Such changes can be produced, for example, by stress, fiber bends, or changes in pressure. The state of polarization changes as light pulses travel along the fiber length, and is sensitive to fiber perturbation. The occurrence and location of a disturbance in the vicinity of a localized portion of the optical fiber can be determined based on the recognition that such a disturbance changes the polarization conditions of light backscattered from the disturbed portion of the optical fiber. The change of the state of the polarization in the optical fiber (sensing fiber) can be detected by the detection of the backscattered light utilizing a polarization-sensitive OTDR (POTDR) device. By inserting a polarization component such as a polarizer into the OTDR path, the polarization change can exhibit itself in the form of intensity change.

In general, because the signal-to noise ratio that can be extracted from the measured OTDR trace is low, monitoring techniques based on POTDR often require extensive filtering and averaging to produce a better signal to noise ratio.

SUMMARY

According to some embodiments of the invention a detection system comprises:

(i) an optical fiber, the optical fiber having: (a) a length $L \geq 1$ km; (b) beat length between 10 m and 100 m; and (c) beat length uniformity over either (1) the length of the fiber characterized by standard deviation $\sigma$, where $|\sigma| \leq 10$ m or (2) over a distance of at least 100 m within the fiber length is characterized by standard deviation $\sigma$, where $|\sigma| \leq 10$ m;

(ii) an OTDR system coupled to said fiber and including (a) a radiation source providing pulsed radiation to the fiber, (b) a detector detecting radiation that is backscattered by the fiber; and (iii) at least one polarizer situated between the optical fiber and the detector, such that the backscattered radiation passes through the polarizer before reaching the detector.

In another embodiment a method for detecting a disturbance along a length of fiber comprising the steps of:

(i) emitting pulsed radiation into a length of optical fiber, said fiber having (a) a length $L \geq 1$ km; (b) beat length between 10 m and 100 m; and (c) beat length uniformity over any distance at least 100 m within the length of the fiber characterized by standard deviation $\sigma$, where $|\sigma| \leq 10$ m;

(ii) measuring radiation that is backscattered back through the fiber; and (iii) analyzing the variation of intensity of said measured radiation to produce information related to the change in time in the measured radiation at a specific location along the length of the fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE EMBODIMENTS

Figure 1:
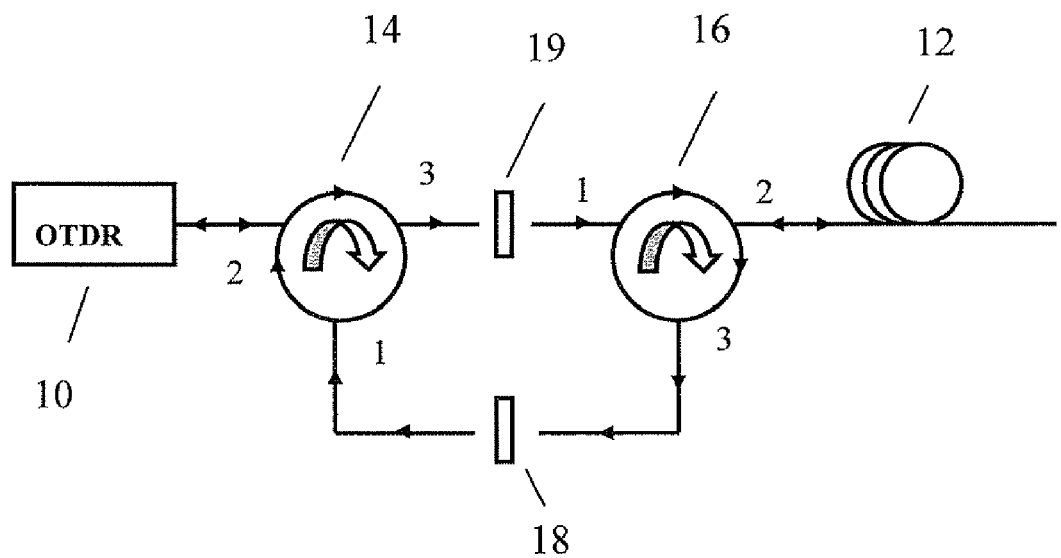
FIG. 1 illustrates schematically a POTDR based detection system according to one embodiment of the present invention.

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

In a fiber optic time domain reflectometer based detection system, a temporal pulse (typically 10 nanoseconds (ns) to 10 milliseconds (ms)) of light is launched into an optical fiber (sensing fiber). As this pulse propagates through the sensing fiber, some of its energy is backscattered due to Rayleigh scattering. The optical characteristics of the backscattered light are dependent upon the fibers' physical and optical properties. When the sensing fiber is broken, bent, or otherwise perturbed, the characteristics of the backscattered light change, and the change can be detected and analyzed.

Information on the physical and optical properties of the sensing fiber can be obtained as a function of fiber length by analyzing the optical properties of the backscattered light in the temporal domain. Further, if the local properties of the sensor fiber are disrupted, then analysis of the change in backscattered light can be used to locate a disturbance along the length L of the fiber. Optical instruments that measure the intensity of the backscattered light along the length of the fiber are, for example, Optical Time Domain Reflectometers (OTDRs). More specifically, the OTDR trace provides information on the intensity of the backscattered light. Other information, such as polarization, or loss of light can be derived from the information on signal intensity of the backscattered light and analyzed.

Reference will now be made in detail to the present preferred embodiment(s) of the invention, examples of which are illustrated in the accompanying drawings. Whenever possible, the same reference numerals will be used throughout the drawings to refer to the same or like parts. One embodiment of the system for detecting a disturbance along the length of the fiber of the present invention is shown in FIG. 1, and is designated generally throughout by the reference numeral 5.

More specifically, as shown in FIG. 1, a detection system 5 (also referred to as a sensing system herein) includes an optical time domain reflectometer OTDR 10 (which in this example is a POTDR device) which is capable of sending pulses of laser light down an optical waveguide fiber (sensing fiber). That is, the OTDR is capable of injecting a series of optical pulses into the sensing fiber. The OTDR can also extract, from the same end of the sensing fiber, light that is scattered back. The intensity of the return pulses is measured and integrated as a function of time, and is plotted as a function of position in fiber (along its length). A temporal pulse of light is launched into an optical fiber (sensing fiber). The pulse duration is preferably 2 ns to 1 µs, and more preferably 50 ns to 500 ns. For example, the pulse duration may be 60 ns, 100 ns, 125 ns, 150 ns, 200 ns, 250 ns, or 300 ns. As shown in FIG. 1, the OTDR 10 launches pulsed radiation into the sensing fiber 12, which is deployed at or around the area where the fiber may be perturbed, for example by an intruder, or by structure deterioration. In the embodiment illustrated in FIG. 1, the detection system utilizes two optical circulators 14 and 16 and two polarizers 18 and 19. The optical circulators 14 and 16 are configured to loop the initial pulse of light emitted from the OTDR 10 to the sensing fiber 12. As a result of Rayleigh backscattering, some light is back reflected or scattered by and through the fiber 12 towards the OTDR 10. In a preferred embodiment, these backscattered pulses are diverted back to the OTDR 10 through a different path. For example, in the embodiment illustrated in FIG. 1, the backscattered pulse is directed through a polarization analyzer 18 (which can be simply a polarizer) before the backscattered light reaches the detector inside the OTDR. (The polarization analyzer 18 enables the detector to have polarization sensitivity). In other embodiments (not shown), the polarization analyzer 18 comprises a combination of at least a waveplate (e.g., ½ or ¼ waveplate) and a polarizer. Note that in the optical circulators 14 and 16 which are illustrated, only port 2 allows the light to come in and out. The traveling of light in all other ports is unidirectional. Specifically, the light is allowed to travel from port 1 to port 2, and from port 2 to port 3 unidirectionally. The arrangement illustrated in FIG. 1 allows more light to return to the OTDR 10 if the optical pulses emitted by the OTDR are already polarized, which is the case for some commercial OTDRs. When the OTDR emission is already polarized (i.e. as in the case of a POTDR), the polarizer 19 between port 3 of optical circulator 14 and port 1 of optical circulator 16 is not needed, thus one source of loss is eliminated, which can help to gain longer dynamic range for the POTDR.

Figure 2:
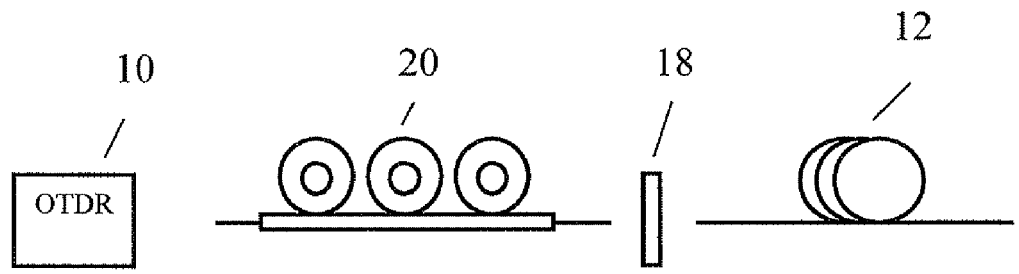
FIG. 2 illustrates schematically an alternative POTDR based detection system according to an embodiment of the present invention.

FIG. 2 illustrates a simpler and lower cost version of a POTDR capable of being utilized in accordance with the present invention, as this embodiment does not use the optical circulators which were utilized in the embodiment illustrated in FIG. 1. In the embodiment illustrated in FIG. 2, OTDR 10 launches the pulse light through a polarization controller 20, which is employed to maximize the amount of light launched into the sensing fiber 12. There are a variety of polarization controllers known in the art. The polarization controller's purpose is to align the state of polarization in the sensing fiber 12 to be incident on the polarizer 18. Some simple polarization controllers include one or more levers attached at different locations along the length of and on the outer periphery of the sensing fiber 12 so that the lever can be moved to twist a segment of sensing fiber 12, so that the state of polarization in the sensing fiber 12 can be properly adjusted to maximize the amount of light that goes through the polarizer 18. After the pulse light travels through the polarization controller 20, it is then directed through the polarizer 18 and then into the sensing fiber 12.

Polarizers 18 and 19 utilized in the POTDR systems of FIGS. 1 and 2 serve two main purposes. First, inline polarizer 19 (in FIG. 1) and 18 (in FIG. 2) assure that light going into the sensing fiber 12 is polarized, although this could also be achieved without the inline polarizer (e.g. by using an OTDR that already emits polarized light). More importantly, inline polarizers 18 (see FIG. 1 and FIG. 2) serve as analyzes for light that is backscattered back from the sensing fiber 12 toward OTDR 10, which light provides information on the state of polarization of the sensing fiber 12. Without the polarizer in place to analyze the backscattered light from the sensing fiber 12, the OTDR would only detect total intensity of the light pulse. However, by incorporating the polarizer 18, information related to the state of polarization along the sensing fiber 12 can also be obtained. This is because, due to geometric asymmetry and strain, optical waveguide fibers carry birefringence. As a result, the state of polarization of a light pulse traveling in the sensing fiber 12 evolves continuously in both the forward propagating direction and the backward propagating direction when the light has been back reflected. The insertion of the polarizer 18, which serves as a polarization analyzer of the backscattered light before the backscattered light is intercepted by the OTDR detector, ensures that the polarization information from different locations along the length of the sensing fiber 12 is captured. The polarizer 18 of FIG. 2 acts both as a polarization controller and a polarization analyzer.

Figure 3:
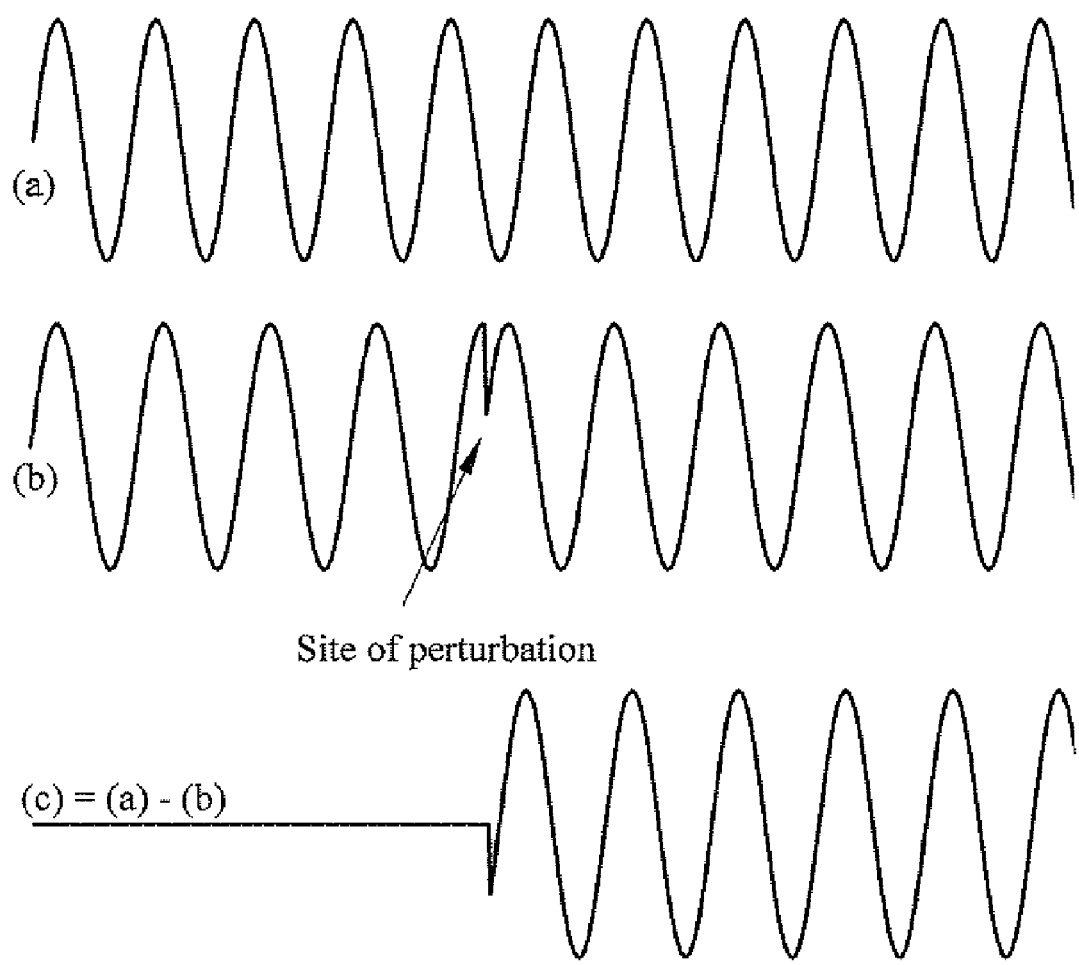
FIG. 3 illustrates schematically POTDR signals with (plot A) and without (plot B) disturbances and the POTDR difference signals (plot C) for detection systems of FIG. 1 or 2.

FIG. 3 illustrates schematically a simplified POTDR trace taken using the setup shown in FIG. 2, with signal intensity I expressed in log scale in dB units versus distance d (in kilometers) along the sensing fiber 12. Similar results can also be obtained from the device illustrated in FIG. 1. More specifically, plot A illustrates the intensity $I_1$ of the backscattered optical signal at a time $T_1$. Plot B illustrates the intensity $I_2$ of the backscattered optical signal at a time $T_2=T_1+\Delta T$, where the fiber was perturbed (for example, by the intruder) at the time $T_2$. Plot C is an intensity difference plot, $I_2-I_1$. Plot C clearly shows that plots A and B were originally identical, but became different at a distance $D_o$ along the fiber, which is the site of the perturbation. No filtering, and preferably no averaging, is required to produce a plot similar to plot C.

More specifically, the polarization state of optical fibers is very sensitive to external perturbations. With the perturbation at a particular position, the local phase of the quasi-periodic modulation of state of polarization is changed and the subsequent POTDR intensity trace is modified. The change of the local phase can be detected in a number of different ways. For example, we can calculate the difference trace before and after the perturbation. As is illustrated in FIG. 3 (plot C), one can clearly see the location of the modeled perturbation as the subtraction would lead to non-zero result at and beyond the location of the perturbation.

In some embodiments, the location of the perturbation is identified, for example, by further processing the difference trace by calculating the standard deviation of the difference trace over a window (for example, around 1 km width) and by sliding such window during the calculation over the whole length L of the fiber. The analysis is referred to herein as "sliding standard deviation trace". The position where the standard deviation rises substantially above zero is the position of the perturbation site. Preferably, the width W of the sliding window is between 50 m and 2 km (i.e., 50 m≦W≦2 km). For example, the width W may be 100 m≦W≦2 km, or 100 m≦W≦1 km.

In the ideal case, when the fiber does not suffer from any non-uniformity in birefringence (orientation and level), the state of polarization evolves periodically along the length of the fiber. According to the embodiments of the present invention, the periodic nature of the traces in FIG. 3 results from the linear birefringence of the sensing fiber 12. Since a polarization analyzer (polarizer) is used, the OTDR signals carry the information of state of polarization of the optical pulses backscattered from the sensing fiber 12. Because according to the embodiments of the present invention the sensing fiber 12 is essentially linearly birefringent, the state of polarization evolves along the sensing fiber 12 periodically. In the detection system 5 that employs the sensing fiber 12 the polarization cycle period is not disturbed, thus resulting in high signal to noise ratio. The spacing D from peak to peak is half of the sensing fiber's beat length. Fiber beat length is the length of sensing fiber 12 along which two different modes of polarization accumulate one optical wavelength of delay. The optical pulse passes the same portion of sensing fiber 12 twice in the standard OTDR configuration. Thus only half of the beat length is needed to accumulate one optical wavelength of delay.

The behavior of the POTDR based detection system according to the embodiments of the present invention can be understood by using a Jones matrix model. The following equations describe the properties of spun fibers and are called coupled mode equations. The following descriptions are applicable to spun fibers. It is noted that when the fiber spin amplitude is set to zero (unspun fibers), the following descriptions are also applicable. The coupled mode equation that describes the full polarization properties of the spun fibers takes the form of, $$\begin{pmatrix} \frac{dA_x}{dz} \\ \frac{dA_y}{dz} \end{pmatrix} = \begin{pmatrix} i\frac{\delta\beta}{2} & \alpha(z) \\ -\alpha(z) & -i\frac{\delta\beta}{2} \end{pmatrix} \cdot \begin{pmatrix} A_x \\ A_y \end{pmatrix} \quad (1)$$

where $A_x$ and $A_y$ are the amplitudes of the electric field of each local polarization mode, $\delta\beta$ is the birefringence of the fiber, which is linked to fiber beat length in a simple form of $\delta\beta=2\pi/L_B$, where $L_B$ is the beat length of the unspun fiber, and $\alpha(z)$ is the fiber spin profile.

In some of the following embodiments of the present invention, the fiber spin profile of interest is the sinusoidal spin profile, $$\alpha(z)=\alpha_0 \cos(\eta z) \quad (2)$$

where $\alpha_0$ is the spin magnitude and $\eta$ is the angular frequency of the spatial modulation. $\eta$ is related to the spin period $\Lambda$ in the form of $\eta=2\pi/\Lambda$, z is a particular position within the fiber relative to a reference point, such as the input end of the fiber.

The Jones matrix of the spun fiber can be obtained through solving Eq. (1) for the initial condition of $A_x(0)=1$, and $A_y(0)=0$. The Jones matrix $J(z)$ can further be constructed by using the $A_x(z)$ and $A_y(z)$ from Eq (1), $$J(z) = \begin{pmatrix} A_x(z) & -A_y^*(z) \\ A_y(z) & A_x^*(z) \end{pmatrix} \quad (3)$$

In the POTDR configuration, the light travels forward and is scattered back and the Jones matrix that describes the return trip is simply the transpose of matrix T(z). Thus, the Jones Matrix associated with the round trip is $M=J^T \cdot J$, where $J^T$ is the transpose of complex matrix J.

In addition, a polarizer may be inserted in the OTDR light path to launch polarized pulses into the fiber, and another polarizer may be placed in the return path to serve as a polarization analyzer. Thus, the normalized electric field impinging on the detector, after the round trip is:

$$\begin{pmatrix} E_{x,out} \\ E_{y,out} \end{pmatrix} = P(\phi_2) \cdot M \cdot \begin{pmatrix} \cos(\phi_1) \\ \sin(\phi_1) \end{pmatrix} \quad (4)$$

where $P(\phi_2)$ is the Jones matrix for a polarizer with polarizing angle $\phi_2$ in the form of $$P(\phi) = \begin{pmatrix} \cos^2(\phi) & \sin(\phi)\cos(\phi) \\ \sin(\phi)\cos(\phi) & \sin^2(\phi) \end{pmatrix}. \quad (5)$$

We can extract the key characteristic of the POTDR trace, such as the spatial period, by calculating the normalized intensity of the backscattered light. The normalized intensity I of the backscattered light relative to its peak value. is $I(z) = |E_{x,out}|^2 + |E_{y,out}|^2$. A linearly birefringent fiber with beat length $L_B$ will exhibit a spatial period SP in the POTDR trace of $L_B/2$ (i.e., SP=$L_B/2$).

For spun fibers we can explore the evolution of state of the polarization and the factors affecting the fiber PMD by using Equation (1). We have identified key equations to link the spatial period SP observed in POTDR with the fiber spinning parameters and the fiber intrinsic beat length for spun fibers. The spatial period SP as observed by POTDR can be expressed in the following equation, $$SP = (1/2)L_B/|J_0(2\alpha/\eta)| = (1/2)L_B' \quad (6)$$

where $J_0(z)$ is the zero order Bessel function, and $$L_B' = \frac{L_B}{|J_0(2\alpha/\eta)|}$$

is the effective beat length of the periodically spun fibers (e.g., sinusoidally spun fibers). Thus, the effective beat length $L_B'$ is defined to be equal to twice the spatial period SP in polarization evolution. (Note that if the spin magnitude (amplitude) is 0, $L_B'=L_B$). Thus, for an unspun fiber the effective beat length is the same as the beat length. Equation (6) describes how the spinning and intrinsic fiber parameter beat length affects the observed spatial period P.

In this model, we considered the whole sensing fiber 12 as one segment of linear birefringent fiber without mode coupling. We had described the linkage between the spatial period and fiber beat length, and also that the signals modulate at the period of $L_B/2$ for the unspun fiber, and $L_B'/2$ for the spun fiber.

However, most fibers exhibit different levels of birefringence non-uniformity together with mode coupling that occurs along the fiber length. Consequently, a fiber having a varying beat length associated with the birefringence non-uniformity may not exhibit a clear periodic POTDR trace. For example, the POTDR trace may be "noisy" because periodic polarization evolution of the light propagating through the fiber is frequently disrupted by random changes of the fiber's birefringent axis and/or the levels of birefringence.

It is also possible that in a distributed sensing system that uses an ordinary sensing fiber, the fiber beat length could fall below the resolution of the POTDR, in which case the variation of the intensity along the fiber will be averaged out and will not be resolvable. This occurs because such variation of the intensity will be significantly reduced within one OTDR pulse width, resulting in low signal to noise ratio. In this case, no judgment, or the wrong judgment, may be made based on the fiber's beat length. This suggests that commonly used fibers may not be adequate for sensor applications, or that many measurements have to be averaged and/or filtered to improve signal to noise ratio.

However, we discovered that utilizing a sensing fiber 12 that has (i) low birefringence, longer beat length (equal to or greater than 10 m, and preferably equal to or greater than 20 m, e.g., 50 m to 100 m), and (ii) high beat length uniformity, in a POTDR based sensing system advantageously provides more sensitive and/or more accurate measurements. That is, using sensing fiber 12 that has a uniform and low birefringence provides a POTDR trace with a sufficiently long period, to allow better sensitivity and/or high resolution. Note, that in order to achieve sufficient spatial resolution, the OTDR (or POTDR) effective pulse width EPW should preferably be shorter than that of the spatial period SP of the polarization evolution. Preferably, EPW<SP, more preferably EPW≦0.8×SP, and even more preferably 0.1SP≦EPW≦0.8 SP, where SP is either $L_B/2$ or $L_B'/2$ (for spun fiber). Preferably, fiber 12 has polarization mode dispersion PMD≦0.05 ps/km$^{1/2}$, more preferably PMD≦0.03 ps/km$^{1/2}$, even more preferably PMD≦0.01 ps/km$^{1/2}$, for example PMD≦0.005 ps/km$^{1/2}$. Preferably, fiber 12 has beat length uniformity beat length uniformity over any distance of at least 100 m within the length of the fiber characterized by standard deviation σ, where |σ|≦10 m. Preferably σ|≦5 m, more preferably |σ|≦2 m, even more preferably |σ|≦1 m. For example, |σ| may be ≦0.5 m, or even ≦0.025 m. More preferably, Preferably, fiber 12 has beat length uniformity beat length uniformity over any distance at least 200 m within the length of the fiber characterized by standard deviation σ, where |σ|≦10 m. Most preferably, fiber 12 has beat length uniformity over the length of the fiber characterized by standard deviation σ, where |σ|≦10 m. Preferably σ|≦5 m, more preferably |σ|≦2 m, even more preferably |σ|≦1 m. For example, |σ| may be ≦0.5 m, or even ≦0.025 m.

A sensing fiber 12 that has low birefringence, longer beat length ($L_B'>10$ m and preferably $L_B'≧20$ m), and high beat length uniformity can be made, for example, by elevating fiber intrinsic birefringence above the non-uniform background birefringence and then by reducing birefringence, while keeping the birefringence level uniform, for example by by-directional or sinusoidal fiber spinning during the draw process.

We can make a sensing fiber 12 that has low and uniform birefringence by first making the fiber preform with higher birefringence (i.e., a preform that can yield an unspun fiber that has, for example, a uniform beat length $L_B$ between 1.5 m and 20 m at 1550 nm) and then producing the fiber 12 by spinning the fiber during the draw process to lower the effective birefringence, so that the effective beat length is, for example, between 10 m and 100m. The spinning can be sinusoidal spinning, with spin magnitude for example, between 1-10 turns/m and spin period between 0.8 m and 30 m. It is noted that $L_B'>L_B$, for example $L_B'>1.5\ L_B$. Preferably $L_B'≧2\ L_B$, or $L_B'≧3\ L_B$, and even more preferably $L_B'≧5\ L_B$, or $L_B'≧10\ L_B$.

The sensing fiber 12 can be manufactured, for example, by including purposely introduced distortion in the core cane, for example through mechanical machining out a portion of the core cane, or by introducing asymmetric heating in the preform making process.

EXAMPLES

The invention will be further clarified by the following examples.

Example 1

Figure 4:
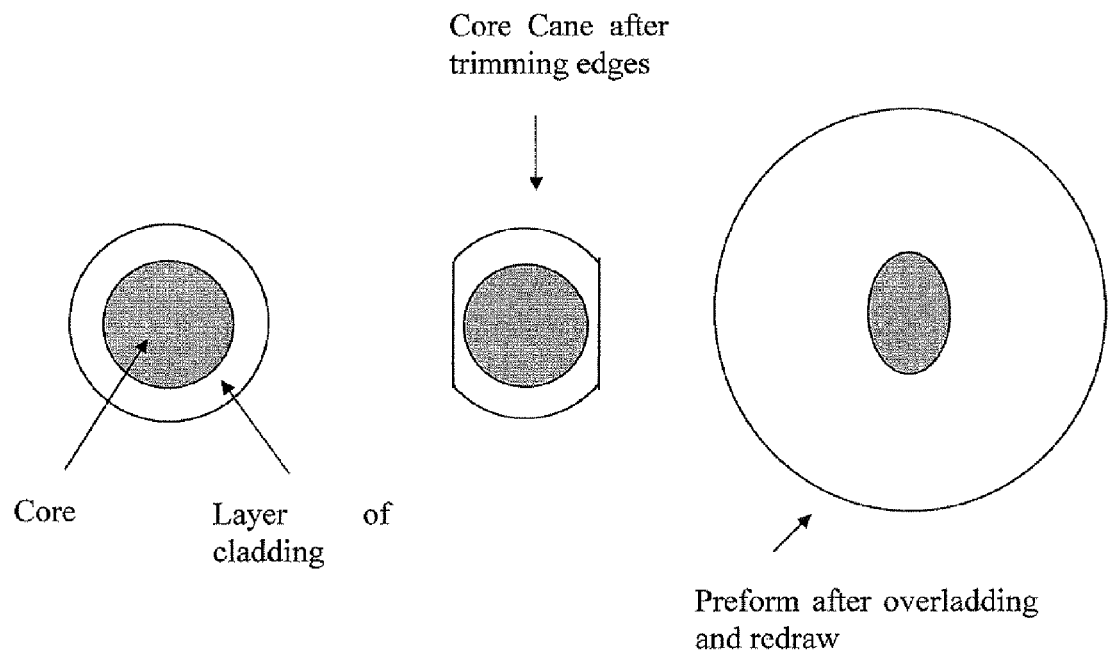
FIG. 4 Illustrates schematically steps of making a fiber preform with added birefringence.
Figure 5:
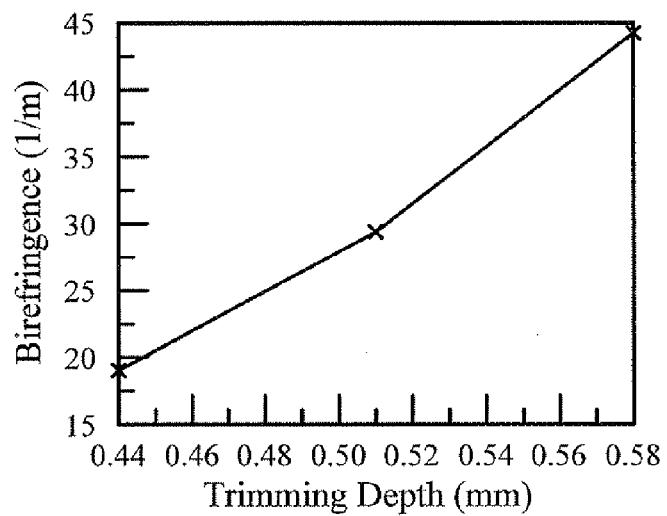
FIG. 5 is a plot of the fibers' birefringence as a function of the preform's trimming depth d.

We machined out an edge of the fiber core cane 50 in order to introduce controlled amount of birefringence at the fiber preform level. This is illustrated in FIG. 4. In the first step, the sides of the core cane 50 were machined to cut off a small amount (trimming depth d) of cladding at two opposing sides of the cane. Note that core cane 50 includes the core portion 52 and a thin layer of the cladding 54A. After the machining, the machined fiber core cane 50' is overclad by additional cladding material to produce a fiber preform 50", and optionally the whole preform is redrawn. During preform consolidation, the core portion of the preform becomes elliptical. Because of the tension at the surface of the core cane, during consolidation when the preform is in molten state, the core portion of the preform is distorted to introduce a significant amount of birefringence. The optical fiber 12 is than drawn from either the fiber preform 50", or from the redrawn fiber preform. For example, according to some embodiments, the ratio of the fiber core length a to the core width b is: $1<(a/b) \leq 1.02$ and preferably $1 \leq (a/b) \leq 1.01$. The amount of the trimming is correlated with the achieved birefringence or beat length. For example, starting with three core canes 50, we machined out the edge from both sides of each of the core canes. Each fiber cane was trimmed by a different amount. Core canes 50 had a core delta of 1% and an overall diameter of 14.4 mm with core diameter of 2.0 mm. The trimmed core canes 50' were further overclad with 5700 g of silica soot (cladding material), and consolidated. Three different fibers 12 were drawn from the resulting preforms, corresponding to each of the differently trimmed core canes, and the fibers' beat lengths were measured at the wavelength of 1550 nm. FIG. 5 is a plot of the fibers' birefringence (defined as $B=2\pi/L_B$) as a function of the trimming depth d. It was found that the trend (i.e., the relationship between B and d) is approximately linear. With this plot we can conveniently predict the unspun fiber's beat length $L_B$ as a function of trimming depth d by conducting interpolation or extrapolation. For example, if the trimming depth d is 0.41 mm, the beat length of the exemplary unspun fiber is 2 m, and the exemplary sinusoidally spun fiber 12 will have a uniform and low PMD (below 0.05 ps/km). Thus, given a required level of intrinsic birefringence, we can find the amount of trimming that will provide this level of birefringence.

Example 2

Figure 6A:
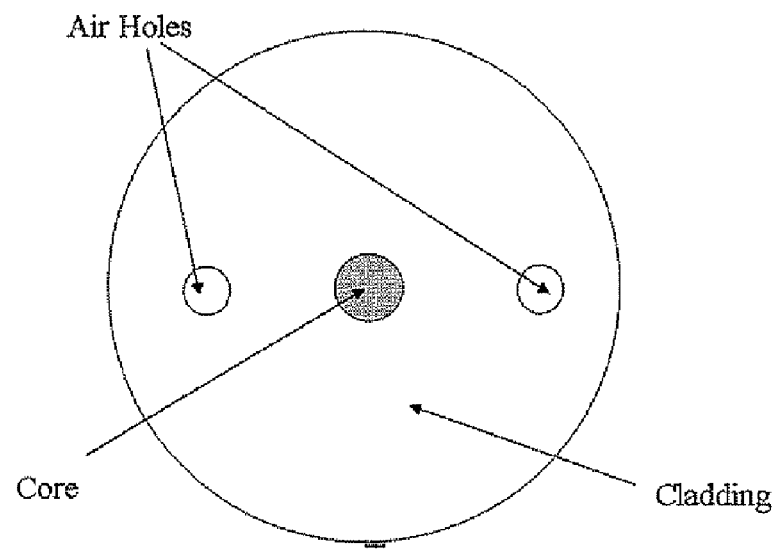
FIGS. 6a and 6b illustrate schematically cross-sectional views of the sensing fibers according to some embodiments of the present invention.
Figure 6B:
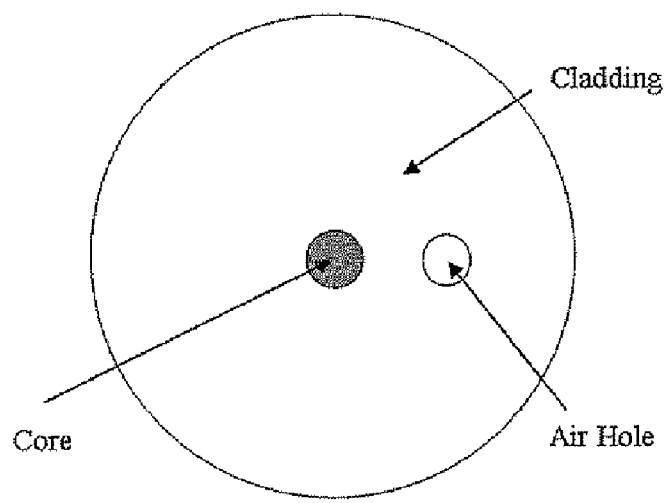
Figure 7:
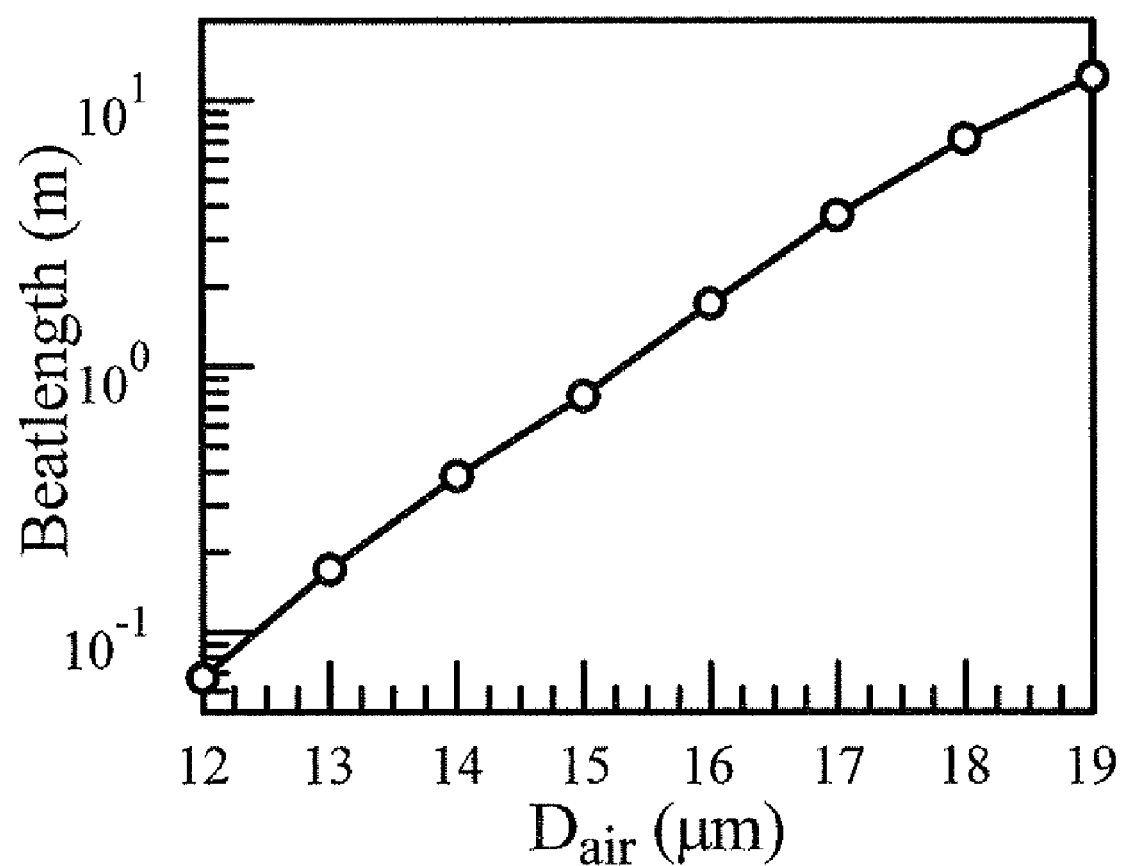
FIG. 7 illustrates the relationship between fiber beat length $L_B$ and the distance $D_{air}$ between the fiber core center and the center of air hole center, in one exemplary sensing fiber.

The fiber birefringence can also be introduced by another method, which is discussed below with reference to FIGS. 6a and 6b. More specifically, FIG. 6a illustrates a cross-section of one exemplary sensing fiber 12. This sensing fiber 12 has two air holes 13A that are placed on two sides of the fiber core 12A, within the cladding 12B. In FIG. 7 we illustrate how, in one exemplary fiber 12, the unspun fiber beat length $L_B$ scales at 1550 nm with the distance $D_{air}$ (i.e., the distance between the fiber core center and the center of air hole center). This exemplary fiber has a core delta $\Delta_{core}$ of 0.34%, the core radius $R_{core}$ of 4.2 µm, and air hole radius $R_{airhole}$ of 6 µm. However, other exemplary fibers may have different delta values, or different core radii, or different air hole radii. However, a plot similar to that of FIG. 7 can be made to determine the relationship between the beat length and the distance between the fiber core center and the air hole center.

FIG. 7 illustrates that when the axis for the beat length is scaled exponentially, the relation between the beat length and the distance $D_{air}$ is almost linear. This makes it convenient to predict the $D_{air}$ that is required for a specified beat length. By properly selecting the distance of the fiber core to the center of the air hole, a fiber beat length between 1.5 m and 20 m, for example, can be achieved. For example, for a target beat length of 3 m at 1550 nm, the $D_{air}$ should be around 17.2 µm. Thus, preferably, according to some embodiments of the present invention, the sensing fiber 12 includes at least one air hole, with air hole radius/radii between 5 µm and 12 µm, and the center to center separation between the fiber core and the air hole is between 12 µm and 40 µm. The preform with the preset birefringence can be further drawn while being provided with either the bidirectional or sinusoidal spinning, in order to make uniform and low birefringent fiber suitable for polarization sensitive distributed sensing. The proper amount of birefringence can also be introduced into a fiber by a single air hole, as illustrated in FIG. 6b.

It should also be noted for robust performance in distributed sensing, a longer beat length is not always better. We are relying on a quasi-periodic evolution of the intensity trace observed by POTDR for intrusion sensing. It is preferred that the effective beat length $L_B'$ of fiber 12 be between 10 m and 200 m and more preferably between 20 m and 100 m, and even more preferably between 20 m and 60 m.

Figure 8:
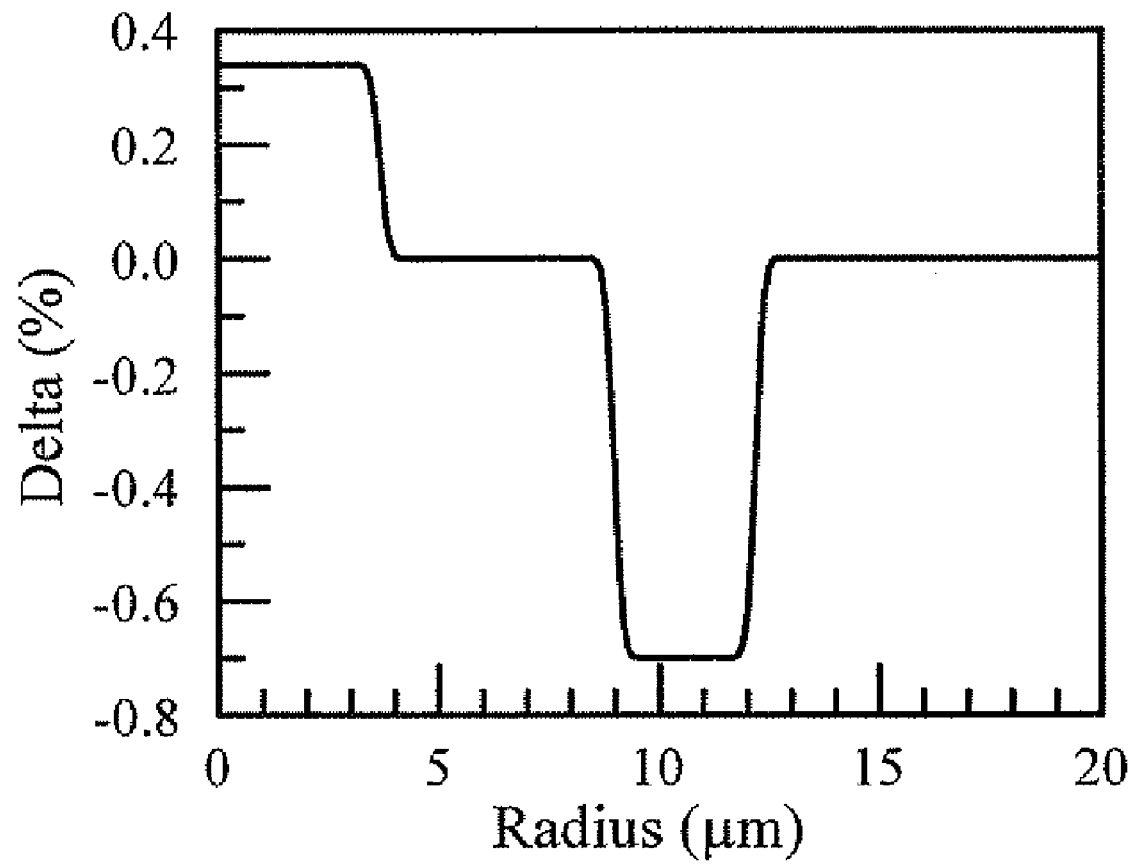
FIG. 8 illustrates an exemplary refractive index profile of a sensing fiber shown in FIG. 6b.

During installation, the sensing fiber 12 may be locally bent to a tight diameter, so it is preferable that the sensing fiber 12 be bending insensitive. Thus, optionally, the sensing fiber 12 can be designed to have low bending loss. This low bending loss is achieved, for example, by the fiber that has a low index trench 12C. The low index trench may be formed, for example, by fluorine doped glass or, or alternatively may include a ring with multiple random airholes. An exemplary refractive index profile of such fiber is shown in FIG. 8. One advantage of utilizing optical fiber 12 with a low bending loss is that such fiber 12 can prevent the interference of the fiber bending loss during determination of intensity signal change induced by the polarization signal. Also, low bending loss makes the sensing fiber 12 suitable for deployment in harsh environment, which can broaden the applicability of the detection system 5.

Thus, in accordance with one embodiment of the present invention, a detection system 5 includes an optical fiber 12 (also referred to as sensing fiber herein) that is characterized by: (a) length $L \geq 1$ km; (b) beat length $L_B'$ between 10 m and 100 m; and (c) beat length uniformity over the length of the fiber characterized by standard deviation σ, where $|\sigma| \leq 10$ m. Preferably the beat length $L_B'$ less than 80 m, more preferably less than 60 m, and most preferably between 20 m and 50 m. Preferably, $|\sigma| \leq 5$ m, more preferably $|\sigma| \leq 2$ m, even more preferably $|\sigma| \leq 1$ m, and most preferably more preferably $|\sigma| \leq 0.5$ m. One advantage of using an improved sensing fiber 12 in detection system 5 is improved detection sensitivity and a better signal to noise ratio than those provided by the OTDR detection systems that utilize standard optical fibers. Fiber length L may be, equal to or greater than 2 km, or equal to or greater than 5 km, or even equal to or greater than 10 km.

A sensing fiber 12 with low and uniform birefringence can be manufactured by first making a fiber preform with higher birefringence (for example a preform that can yield an unspun fiber with a uniform beat length between 1.5 m and 20, measured at 1550 nm) and then producing the fiber 12 by spinning the fiber during the draw process to lower the effective birefringence, so that the effective beat length is, for example, between 10 m and 200 m. The spinning can be sinusoidal spinning, with spin magnitude for example, between about 1 and 10 turns/m (e.g., 1, 1.5, 2, 3, 4, 5, 8, 9, or 10 turns/m) and spin period between about 0.8 m and 50 m (e.g., 0.8, 0.9, 1, 2, 5, 10, 15, 20, 25, 30 or 40 m).

Example 3

This exemplary embodiment illustrates how the location of a perturbation can be detected by utilizing auto correlation. The sensing fiber of this embodiment is a single mode fiber wound on a real that has a diameter of slightly greater than 10 cm. The sensing fiber has a beat length of greater than OTDR pulse width, so that polarization evolution of the fiber, as exhibited by the intensity fluctuation in POTDR trace, can be observed.

Figure 9:
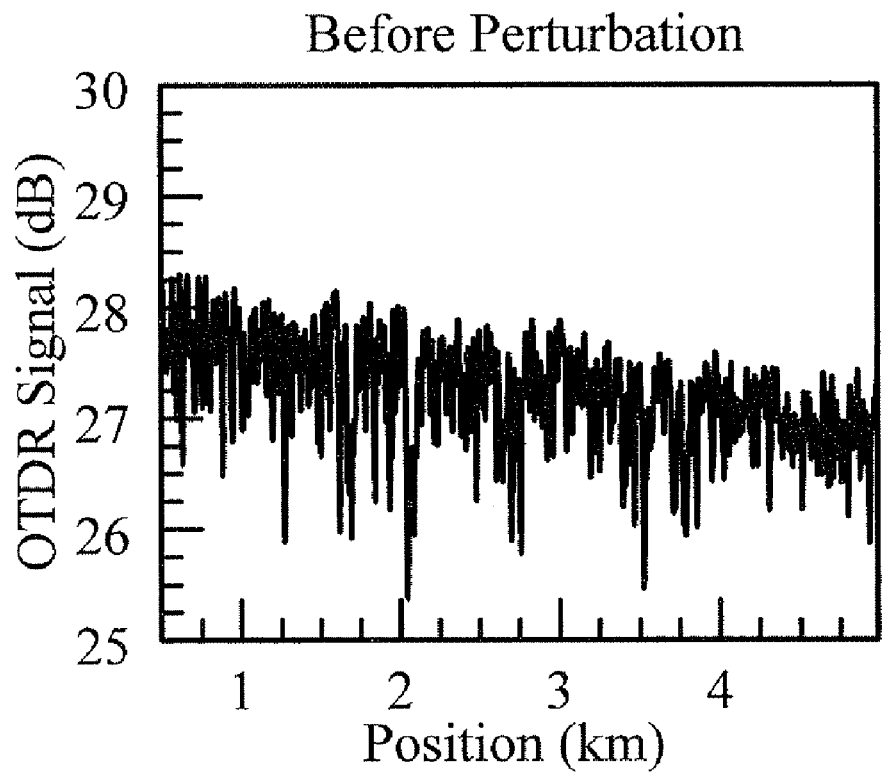
FIGS. 9 and 10 illustrate exemplary POTDR traces, obtained before and after the perturbation, respectively.
Figure 10:
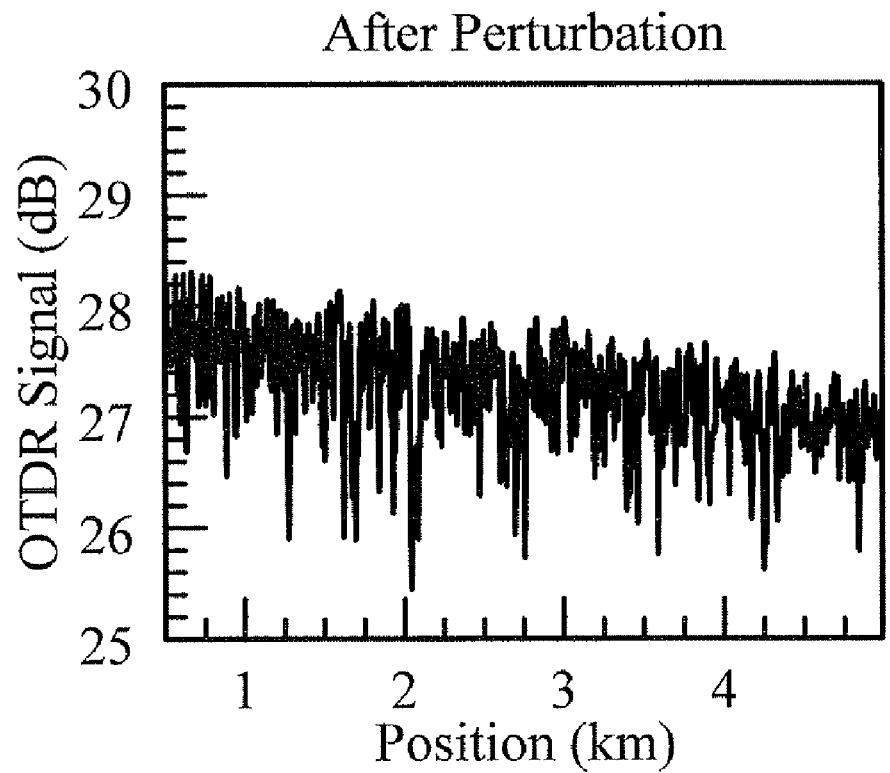
Figure 11:
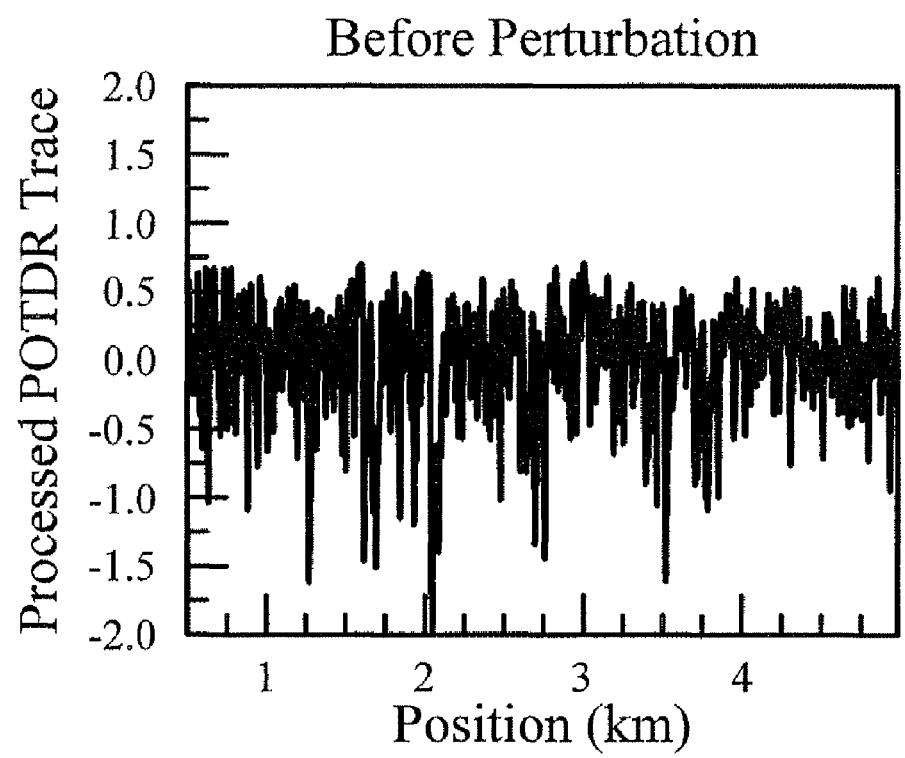
FIGS. 11 and 12 illustrate exemplary processed POTDR traces.
Figure 12:
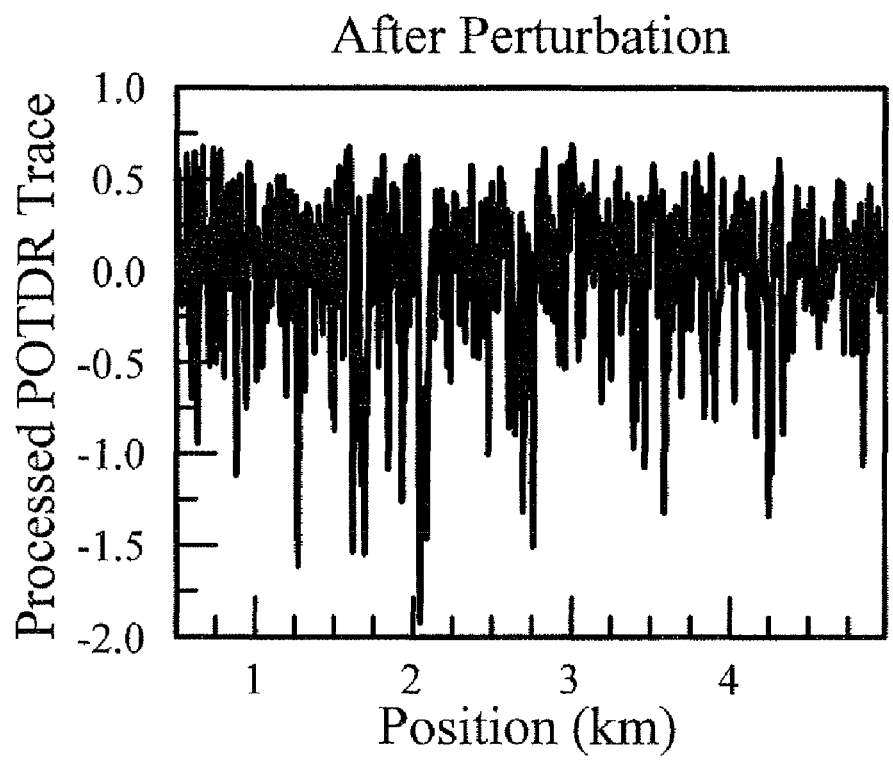

First, the POTDR traces before and after the perturbations are obtained. Such exemplary traces are shown in the FIGS. 9 and 10. The traces shown in these figures appear to be similar to one another. The detailed differences are in the fine details which are not clearly shown in these figures. Therefore, in order to identify the precise location of the perturbation, we performed the following steps. As shown in FIGS. 9 and 10, polarization related information is in general embedded in the background that depicts fiber attenuation. Note that the center line of the POTDR trace has a negative slope. Since the polarization sensitive information carries the information related to the local perturbation, in the first step, we subtracted the negative slope line from the POTDR trace, so that we now have only the information related to the local information, which we call the processed POTDR traces, and which are shown in FIGS. 11 and 12. The original OTDR traces can be labeled as Pb(z) and Pa(z) respectively, for the trace before and after the perturbation. The removal of the linear slope resulting in processed the processed POTDR trace is described by the equation $S_i(z)=P_i(z)-(c_i+d_i z)$, where i=b or a, representing traces obtained 'before' and 'after' respectively, and $c_i$ and $d_i$ are the two parameters that uniquely determine the straight line taken out from $P_i(z)$, which are determined by linear regression resulting in a better fitting of the overall trace.

Figure 13:
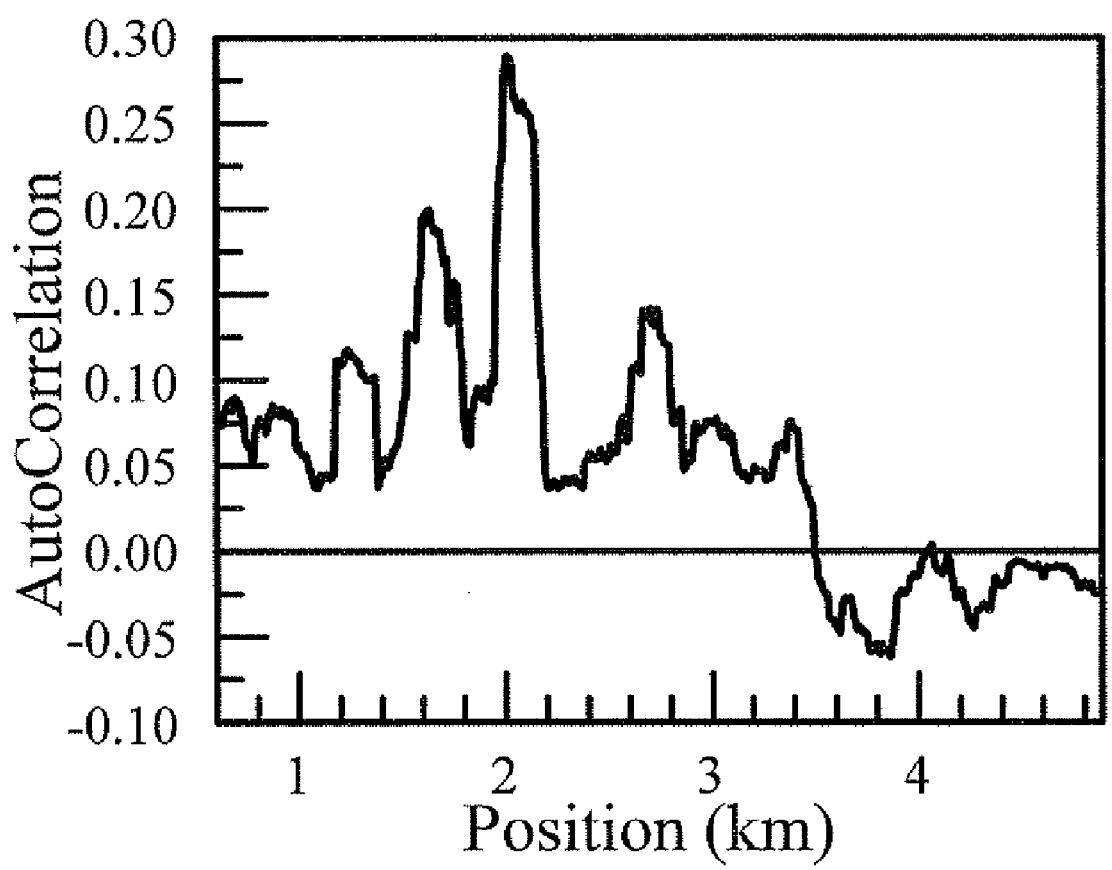
FIG. 13 is a plot of an exemplary autocorrelation function.

The location of the perturbation can be obtained by building the autocorrelation function of the two processed POTDR traces. We calculate the autocorrelation according to the following equation, $$\tau(z) = \frac{1}{w}\int_{z-0.5w}^{z+0.5w} S_b(z')S_a(z')dz'$$

where w is the width of the window used to calculate the autocorrelation. The selection of the window width w is not critical. The width w, for example, can be between 50 m and 1000 m. Using a window width of 200 m, as an example, we calculate the autocorrelation function as shown in FIG. 13 below. The position at which the autocorrelation curve crosses the zero level is the position of the perturbation. In this case, the position of the perturbation is located at 3.5 km, which agrees with the position we set to incur the perturbation.

Example 4

In this example, we illustrate the results of a fiber produced according to one embodiment of the current invention. The 24.9 mm diameter core cane was first trimmed by an amount d=0.8 mm at each side. The trimmed core cane 50' was overclad by additional cladding material to produce a fiber preform 50". An unspun fiber was first drawn to measure the fiber beatlength without the spinning effect. The resulted unspun fiber has a beatlength of 3 m around 1550 nm wavelength. Because the unspun fiber birefringence (as exhibited by the beatlength) is largely induced by the trimming of the core cane (machining off the portions of the core cane), the overall birefringence of the unspun fiber is relatively large and is very uniform.

Next, a spun fiber was drawn from the fiber preform 50" by bidirectionally spinning the fiber during drawing. The spun fiber was first wound on a spool of 30 cm diameter, with zero tension. Under this condition, the induced birefringence due to bending and tension is very minor. For example, the birefringence induced by winding the spun fiber on the spool is characterized by the beat length of at least 300 m, or longer. Therefore, the condition of the sensing fiber 12 is substantially identical to the fiber condition deployed in the field, or in a straight condition.

Figure 14:
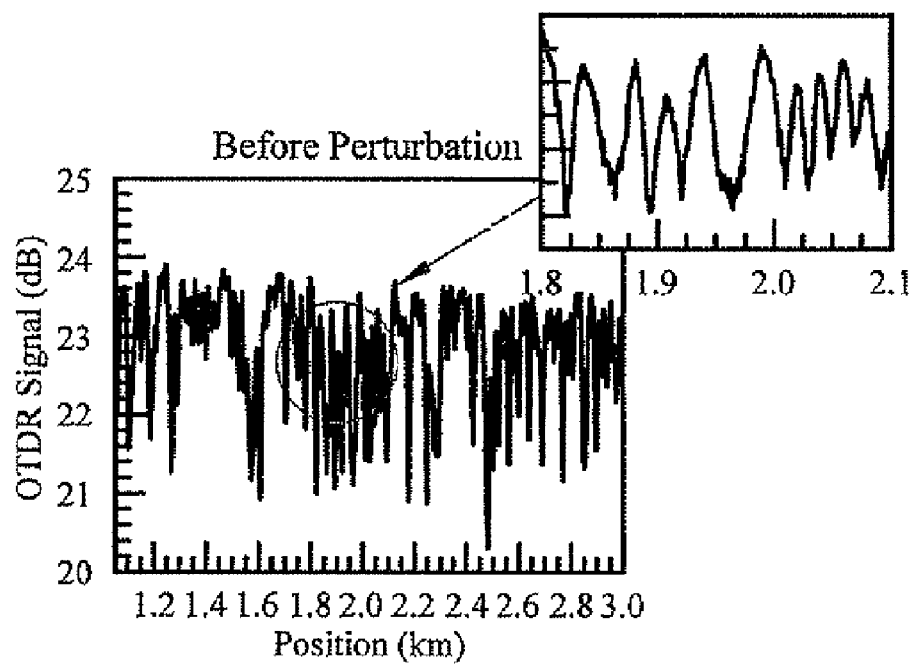
FIGS. 14 and 15 are exemplary POTDR traces, obtained before and after the perturbation, respectively.
Figure 15:
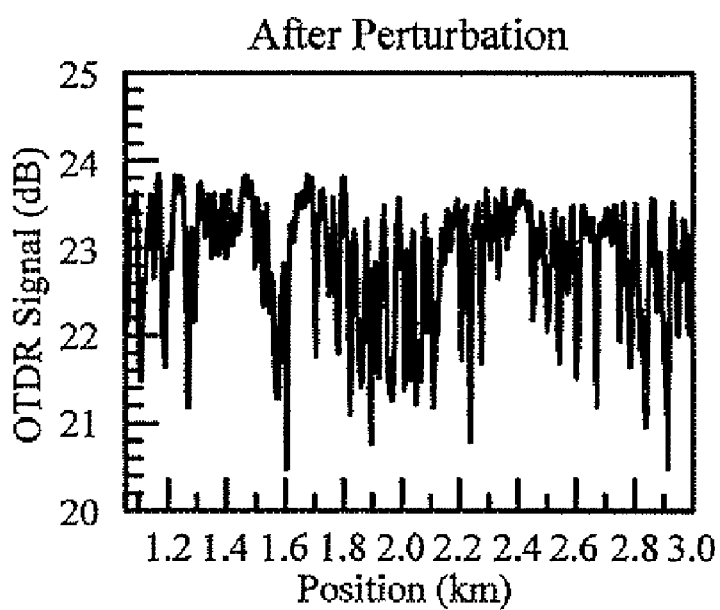

A short portion somewhere along the middle of the fiber length was then perturbed, so that we could study the effects of perturbation. The POTDR traces before and after the perturbations were obtained. Such exemplary traces are shown in the FIGS. 14 and 15. More specifically, FIG. 14 illustrates the POTDR trace obtained before the perturbation. A section of this trace is shown enlarged to better illustrate the quasi-periodic variation due to polarization evolution along the fiber. FIG. 15 illustrates the POTDR trace obtained after the perturbation.

Figure 16:
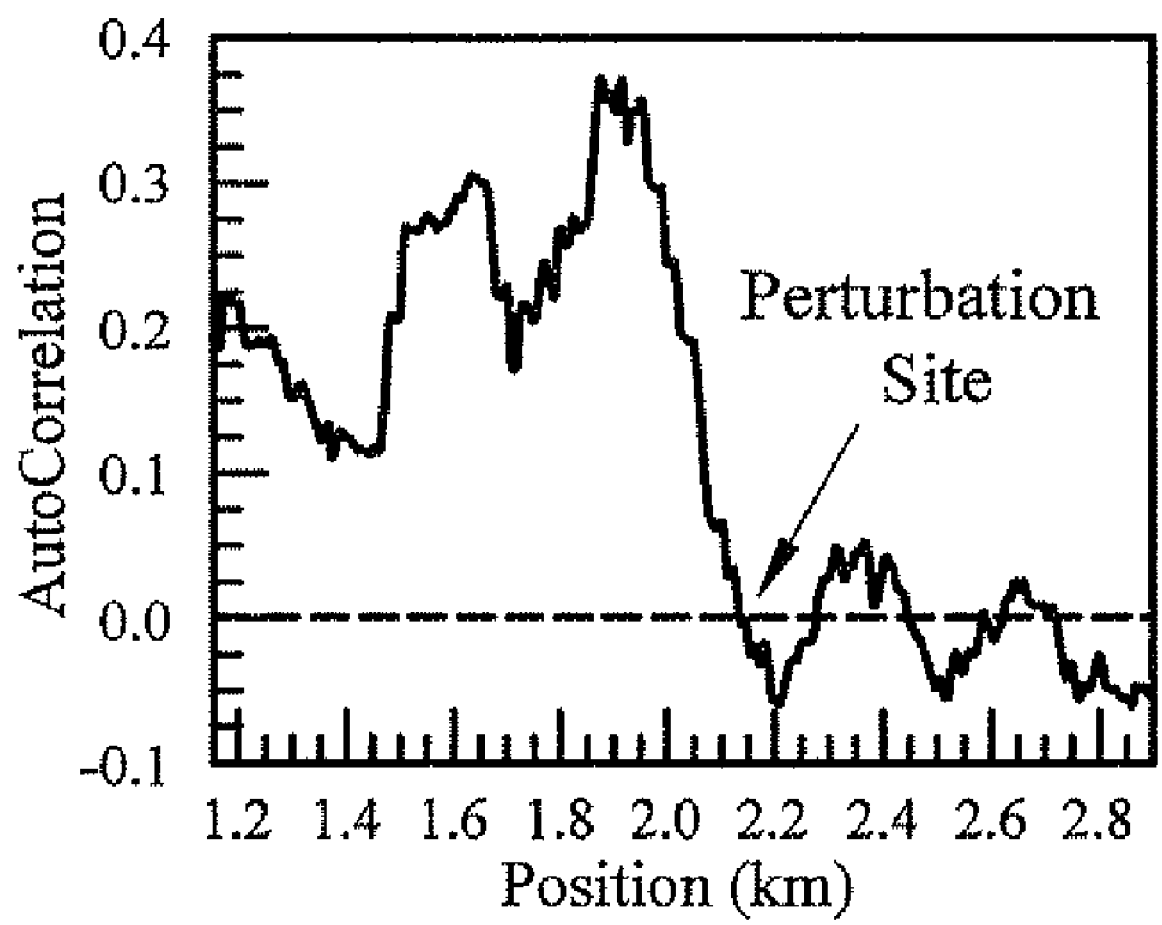
FIG. 16 is a plot of an exemplary autocorrelation function corresponding to FIGS. 14 and 15.

As exhibited by the zoomed section in FIG. 14, the effective beatlength of the spun fiber was around 60 m, which is much longer than 3 m beatlength in the unspun fiber made from the same preform, and is what is expected (i.e., the birefringence was uniform and low). The POTDR traces shown in these figures appear to be similar to one another. The detailed differences are in the fine details which are not clearly shown in these figures. Therefore, in order to identify the precise location of the perturbation, we performed additional steps, similar to those performed in Example 3. Processed POTDR traces were obtained after the removal of the linear slope. Using a window width of 200 m, as an example, we calculated the autocorrelation function shown in FIG. 16. The position at which the autocorrelation curve first crosses the zero level is the position of the perturbation. In this case, the position of the perturbation is located at a distance of 2.32 km (relative to the output port of the OTDR device).

Thus, in accordance with some embodiments of the present invention, a detection system includes:

(i) an optical fiber, the optical fiber (sensor fiber) having (a) a length L≧1 km; (b) beat length $L_B$ between 10 m and 100 m; and (c) beat length uniformity any distance of at least 100 m within the length of the fiber characterized by standard deviation σ characterized by standard deviation σ, where |σ|≦10 m.

(ii) an OTDR system coupled to said fiber and including (a) a radiation source providing pulsed radiation to the fiber, a (b) detector detecting radiation that is backscattered by the fiber; and (iii) at least one polarizer situated between the optical fiber and the detector, such that the backscattered radiation passes through the polarizer before reaching the detector.

Preferably, beat length uniformity over any distance of at least 200 m within the length of the fiber is characterized by standard deviation σ characterized by standard deviation σ, where |σ|≦10 m and more preferably |σ|≦5 m. More preferably, the beat length uniformity over the entire length of the fiber characterized by standard deviation σ, where |σ|≦10 m and more preferably |σ|≦5 m.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A detection system comprising:
   (i) an optical fiber, said optical fiber having (a) a length $L \geq 1$ km; (b) effective beat length between 10 m and 200 m; and (c) beat length uniformity over the length of the fiber is characterized by standard deviation $\sigma$, where $|\sigma| \leq 10$ m;
   (ii) an OTDR coupled to said fiber and including (a) a radiation source providing pulsed radiation to said fiber, (b) a detection system capable of detecting radiation that is backscattered back by the fiber;
   (iii) at least one polarizer situated between said fiber and said detector, such that the backscattered radiation passes through said polarizer before reaching said detector.

2. A detection system comprising:
   (i) an optical fiber, said optical fiber having (a) a length $L \geq 1$ km; (b) effective beat length between 10 m and 200 m; and (c) beat length uniformity over any distance of at least 100 m within the length L characterized by standard deviation $\sigma$, where $|\sigma| \leq 10$ m;
   (ii) an OTDR coupled to said fiber and including (a) a radiation source providing pulsed radiation to said fiber, (b) a detection system capable of detecting radiation that is backscattered back by the fiber;
   (iii) at least one polarizer situated between said fiber and said detector, such that the backscattered radiation passes through said polarizer before reaching said detector.

3. The detection system according to claim 2, wherein $|\sigma| \leq 5$ m.

4. The detection system according to claim 2, wherein the beat length uniformity over any distance of at least 200 m within the fiber length L is characterized by standard deviation $\sigma$, where $|\sigma| \leq 10$ m.

5. The detection system according to claim 2, wherein $L \geq 5$ km.

6. The detection system according to claim 2, wherein fiber beat length is between 20 m and 100 m.

7. The detection system according to claim 2, wherein said fiber has polarization mode dispersion $PMD \leq 0.05$ ps/km$^{1/2}$.

8. The detection system according to claim 2, wherein said fiber has polarization mode dispersion $PMD \leq 0.02$ ps/km$^{1/2}$.

9. The detection system according to claim 2, wherein said fiber has at least one air hole, and the center to center separation between the fiber core and said at least one air hole is between 12 μm and 40 μm.

10. The detection system according to claim 2, wherein said fiber has spin magnitude between 1 and 10 turns/m and spin period between 0.8 m and 30 m.

11. The detection system according to claim 2, wherein said fiber is a spun fiber with a spin period of 5 m and 50 m.

12. The detection system according to claim 11, wherein said fiber is a spun fiber with a sinusoidal spin cycle.

13. The detection system according to claim 2, wherein said detection system further includes a second polarizer.

14. The detection system according to claim 2, wherein both said pulsed radiation from said radiation source and said backscattered radiation passes through said polarizer.

15. A detection system comprising:
   (i) an optical fiber, said optical fiber having (a) a length $L \geq 2$ km; (b) effective beat length between 20 m and 150 m; (c) beat length uniformity over any distance at least 100 m within the length L characterized by standard deviation $\sigma$, where $|\sigma| \leq 5$ m; and polarization mode dispersion $PMD \leq 0.03$ ps/km$^{1/2}$;
   (ii) an OTDR coupled to said fiber and including (a) a radiation source providing pulsed radiation to said fiber, (ii) a detector detecting radiation that is backscattered through the fiber;
   (iii) at least one polarizer situated between said optical fiber and said detector, such that the backscattered radiation passes through said polarizer before reaching said detector.

16. The detection system according to claim 15, wherein said fiber has polarization mode dispersion $PMD \leq 0.01$ ps/km$^{1/2}$, beat length between 30 m and 100 m, and beat length uniformity over the length of the fiber characterized by standard deviation $\sigma$, where $|\sigma| \leq 2$ m.

17. A method for detecting a disturbance along a length of fiber comprising the steps of:
   (i) emitting pulsed radiation into a length of optical fiber, said fiber having (a) a length $L \geq 1$ km; (b) effective beat length between 10 m and 100 m; and (c) beat length uniformity any distance at least 100 m within the length L characterized by standard deviation $\sigma$, where $|\sigma| \leq 10$ m;
   (ii) measuring radiation that is backscattered back through said fiber with a polarization sensitive device;
   (iii) analyzing the variation of intensity of said measured radiation to produce information related to change in time in said measured radiation at a specific location along the length of the fiber.

18. The method for detecting a disturbance along a length of fiber according to claim 17, wherein said method further includes the step of obtaining intensities of backscattered light before and after fiber perturbation, and analyzing the difference therebetween.

19. The method for detecting a disturbance along a length of fiber according to claim 17, wherein said method includes the step of identifying location of fiber perturbation.

20. The method for detecting a disturbance along a length of fiber according to claim 19, wherein said method utilizes: (i) sliding standard deviation trace; or (ii) an auto correlation function; and wherein said trace or autocorrelation function utilizes window width W, where 50 m $\leq$ W $\leq$ 2000 m.

* * * * *